United States Patent [19]

Herbert

[11] 4,373,788

[45] *Feb. 15, 1983

[54] UNDERWATER VISION DEVICE

[76] Inventor: M. Linton Herbert, 14255 Rosemary La., Apt. 8104, Largo, Fla. 33540

[ * ] Notice: The portion of the term of this patent subsequent to Mar. 17, 1998, has been disclaimed.

[21] Appl. No.: 226,495

[22] Filed: Jan. 19, 1981

Related U.S. Application Data

[63] Continuation-in-part of Ser. No. 96,898, Nov. 23, 1979, Pat. No. 4,256,386.

[51] Int. Cl.³ .............................................. G02C 1/00
[52] U.S. Cl. ...................................... 351/43; 350/418
[58] Field of Search ................... 351/5, 43; 2/430; 350/418

[56] References Cited

U.S. PATENT DOCUMENTS

| | | | |
|---|---|---|---|
| 2,008,530 | 7/1935 | Wick | 351/43 |
| 3,040,616 | 6/1962 | Simpson | 351/43 X |
| 3,320,018 | 5/1967 | Pepke | 351/43 |
| 3,976,364 | 8/1976 | Lindemann et al. | 351/43 |

Primary Examiner—John K. Corbin
Assistant Examiner—Rodney B. Bovernick
Attorney, Agent, or Firm—Cahill, Sutton & Thomas

[57] ABSTRACT

An underwater vision device includes first and second lens elements which are maintained in alignment with the eyes of a wearer by a frame. Each lens element includes first and second lens groups. Each lens group includes a first solid transparent lens, a second solid transparent lens and a compressible seal which secures the first and second lenses together and forms a sealed air chamber between the two lenses. A spacer couples the first and second lens groups together and forms a chamber between the two lens groups. This chamber fills with water when the underwater vision device is submerged. The optical parameters of the underwater vision device can be varied so that neutral magnification is provided when the device is not submerged in water, but strong magnification is provided when the device is submerged. If so constructed the underwater vision device permits a wearer to see normally below the surface of a body of water, eliminating the need for a face mask.

20 Claims, 7 Drawing Figures

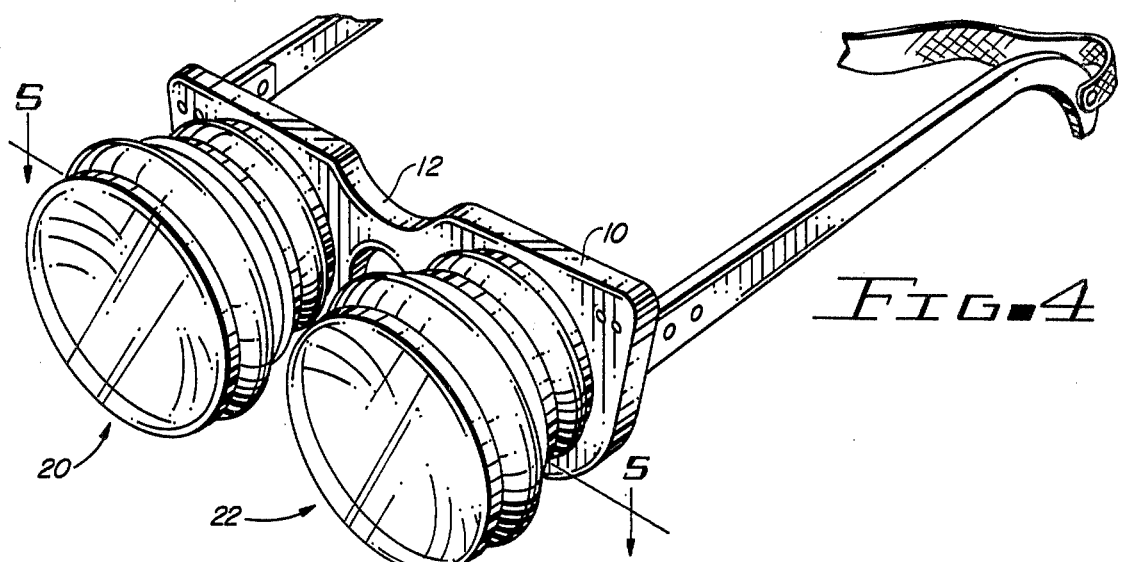
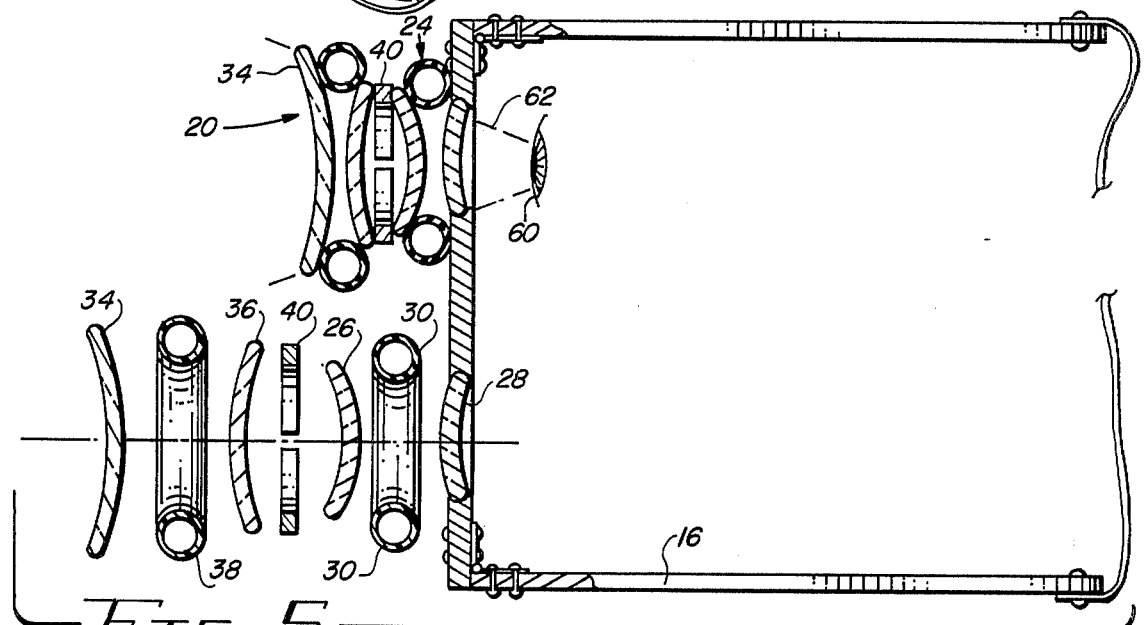
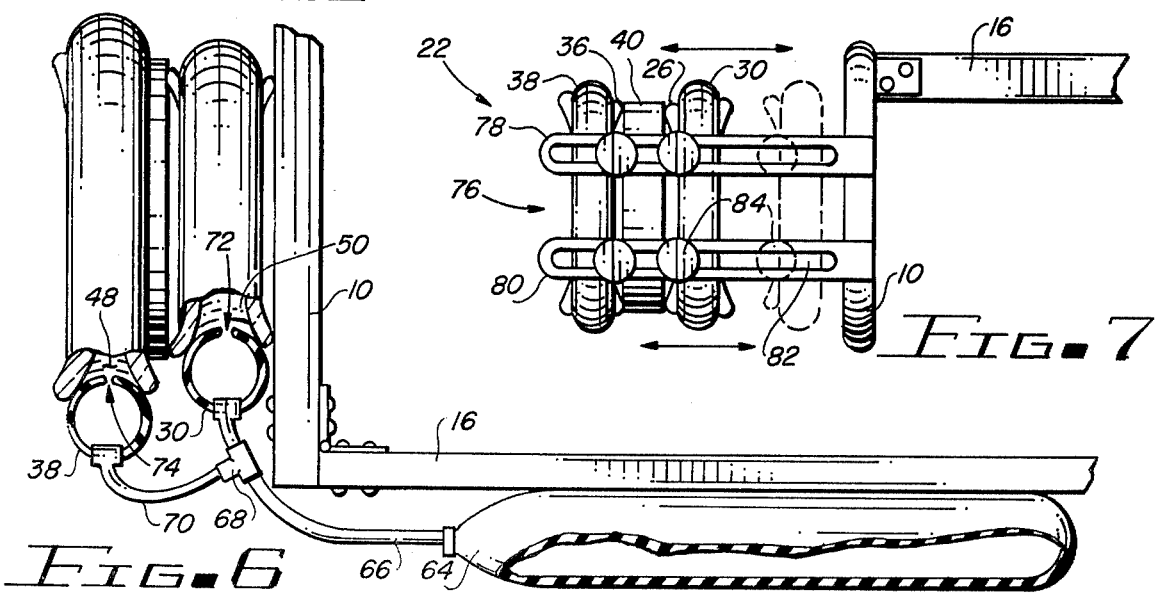

UNDERWATER VISION DEVICE

This patent application is a continuation-in-part of patent application Ser. No. 96,898 filed on Nov. 23, 1979 U.S. Pat. No. 4,256,386.

BACKGROUND OF THE INVENTION

1. Field of the Invention

The present invention relates to underwater vision devices, and more particularly, to underwater vision devices having multi-element lenses which provide neutral magnification above the surface of water and strong magnification below the surface of the water to permit a wearer to see normally both above and below the surface of the water without adjusting the device.

2. Description of the Prior Art

A variety of various types of underwater vision devices are disclosed in the prior art. U.S. Pat. No. 2,008,530 (Wick) discloses submarine glasses coupled to a spectacle-like frame and are intended to be worn by a swimmer either above or below the surface of a body of water. Each of the two optical systems of these glasses is fabricated from thin transparent celluloid and includes a sealed air chamber. These lens elements function only in the presence of water; in the air the negligible thickness of the transparent celluloid fails to have any significant refractive effect on light passing through each lens element. Because of this characteristic, the Wick submarine glasses can be worn either above or below water.

U.S. Pat. No. 2,088,262 (Grano) discloses underwater spectacles. Many of the various lens embodiments disclosed in the Grano patent are fabricated from glass, but several embodiments include an air filled chamber adjacent to a glass lens.

U.S. Pat. No. 3,040,616 (Simpson) discloses a face mask which includes an air chamber between the transparent front surface of the face mask and the face of the wearer. A complex lens system is positioned in alignment with the eye of the wearer. Each element of this lens system includes a transparent refractive material, an air cavity and a layer of water. The purpose of this invention is to permit the wearer of the device to see normally while above or below the surface of the water.

U.S. Pat. No. 3,672,750 (Hagen) discloses an underwater diving mask which includes a pair of lens systems which form an air chamber between the face mask and the eyes of the wearer. The central portion of each part of this mask which is aligned with an eye of the wearer includes a corrective spherical lens. This mask allows an underwater diver to have vision substantially comparable with that which he would have in an air environment.

The following U.S. patents disclose optical systems which utilize various types of optical mediums of varying refractive indices: U.S. Pat. Nos. 3,976,364 (Lindemann); 2,730,014 (Ivanoff); and 3,320,018 (Pepke).

SUMMARY OF THE INVENTION

It is the principal object of the present invention to provide an underwater vision device having a first lens element including a first lens group and a second lens group separated by a chamber which fills with water when the device is submerged below the surface of water.

A more specific object of the invention is to provide an underwater vision device in which the second lens group is positioned at a greater distance from the eye of the wearer than the first lens group in order to provide substantially increased underwater magnification with a lens system having a comparatively large radius of curvature thus permitting a substantially wider undistorted field of vision than prior art devices.

Another object of the present invention is to provide an underwater vision device in which the first and second lens groups each include a sealed air chamber.

A further object of the present invention is to provide an underwater vision device having a compressible seal between the solid transparent lenses of each of the first and second lens groups to permit mechanical displacements of the lens elements as the device is subjected to increasingly greater underwater pressures.

Briefly stated, and in accord with one embodiment of the invention, an underwater vision device is supported by the nose and ears of a wearer. A frame includes a front element having a nose piece for contacting and being supported by the wearer's nose. The front element includes first and second apertures which are aligned with the wearer's eyes. A first ear piece is coupled to one end of the front element while a second ear piece is coupled to the other end of the front element. The first and second ear pieces contact the wearer's ears to maintain the frame in a desired fixed position on the wearer.

First and second lens elements are coupled to the front element in alignment with the first and second apertures. Each of the first and second lens elements include first and second lens groups and spacer means which is coupled to the first and second lens groups for maintaining a predetermined spacing between these lens groups and for maintaining the second lens group in alignment with the first lens group. A cavity is formed between the first and second lens groups and fills with water when the device is immersed. Each lens group includes a first solid transparent lens, a second solid transparent lens, and securing means coupled to the first and second lenses for securing the first and second lenses together and for forming a sealed air chamber.

DESCRIPTION OF THE DRAWINGS

The invention is pointed out with particularity in the appended claims. However, other objects and advantages together with the operation of the invention may be better understood by reference to the following detailed description taken in conjunction with the following illustrations:

FIG. 4 is a perspective view of a second preferred embodiment of the underwater vision device, particularly illustrating tapered lens elements which increase peripheral vision.

FIG. 5 is a sectional view of the underwater vision device illustrated in FIG. 4, taken along section lines 5—5.

FIG. 6 is a partially cut away view from above of another embodiment of the present invention which includes a collapsible air bladder for equalizing the pressure within sections of the lens element of the present invention.

FIG. 7 is a partially cut away perspective view from the side of yet another embodiment of the present invention which illustrates the addition of a bracket and slip joint assembly to the underwater vision device which permits the lens elements to be displaced fore and aft for the purpose of focusing.

DETAILED DESCRIPTION OF THE INVENTION

In order to better illustrate the advantages of the invention and its contributions to the art, various mechanical features of the preferred embodiment will now be reviewed in detail.

The underwater vision device of the present invention includes a commerically available spectacle frame having a front element 10. Nose piece 12 contacts and is supported by the nose of the wearer. Front element 10 includes first and second apertures which are aligned with the wearer's eyes when the underwater vision device is properly positioned on the wearer's head. Ear pieces 14 and 16 are coupled to front element 10 and are designed to contact the wearer's ears to maintain the underwater vision device in a desired fixed position of the wearer's head. The two ends of an elastic strap 18 are coupled as shown in FIG. 1 and assist in maintaining the device in a fixed position on the wearer's head.

Figure 1:
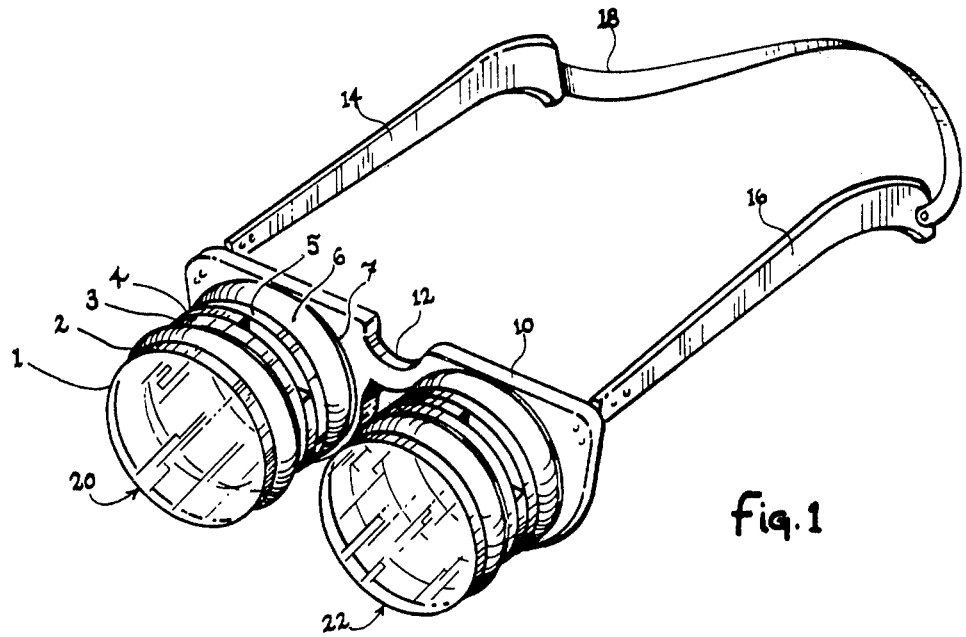
FIG. 1 is a perspective view of a preferred embodiment of the underwater vision device.
Figure 2:
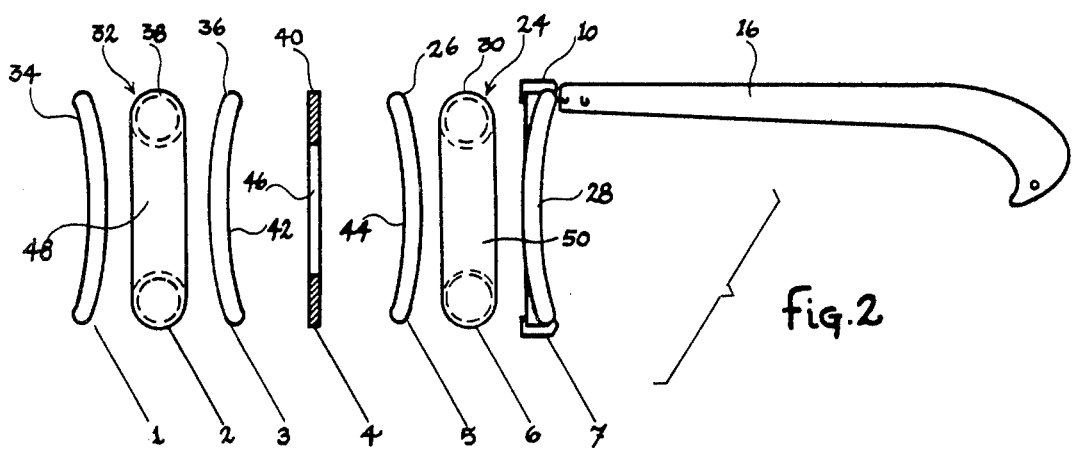
FIG. 2 is an exploded sectional view illustrating the various elements forming the underwater vision device.

Identical multi-element lens elements 20 and 22 are coupled in alignment with the apertures in front element 10 as is illustrated in FIGS. 1 and 2. Since the various structural elements of lens elements 20 and 22 are identical the specific structure of only one lens element will be discussed in detail.

Referring now to FIGS. 1 and 2, lens element 20 includes a first lens group 24. First lens group 24 includes first and second concave-convex lenses 26 and 28. The concave and convex surfaces of lenses 26 and 28 are parallel so that these lenses have virtually no refractive effect in air. Lens 28 is coupled to front element 10 of the spectacle frame as shown. Securing means in the form of a hollow plastic or Teflon tube 30 is formed in the shape of a circle. The two ends of tube 30 are sealed together to maintain a circular configuration and to maintain a sealed air cavity within the interior hollow tubular section of tube 30. An adhesive or an equivalent substance is applied around the periphery of the tube 30 to couple lenses 26 and 28 and tube 30 together. Lens 28 is mechanically secured to front element 10 of the spectacle frame in a well known conventional manner.

A second lens group 32 includes concave-convex lens elements 34 and 36 identical in structure to lenses 26 and 28 and are adhesively coupled to tube 38 in the same manner as was discussed above in connection with first lens group 34.

Spacer means 40 is positioned between lens groups 24 and 32. Spacer means 40 maintains lens group 32 in alignment with lens group 24 and maintains a predetermined fixed lateral spacing between these two lens groups. If spacer means 40 takes the form of a hollow centered disc as illustrated in FIG. 2, it will also include a plurality of perforations or apertures around the periphery to permit a free flow of water into the cavity formed between surfaces 42 and 44 of lenses 36 and 26. This cavity or flooding chamber designated generally by reference numeral 46 will quickly fill with water when the underwater vision device is submerged below the surface of the water. Spacer means 40 may also take various other forms such as a plurality of spot connectors for mechanically securing lens groups 24 and 32 together or any other equivalent mechanical structure which will accomplish the same function without interferring with the wearer's line of vision through the lens system of the present invention.

Figure 3:
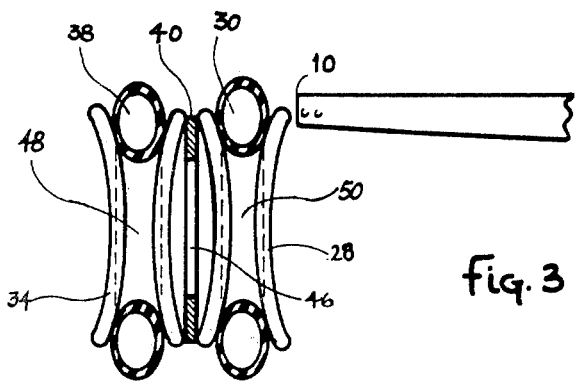
FIG. 3 is a sectional view showing the manner in which the securing means permits the first and second solid transparent lens elements of each lens group to be compressed as the underwater vision device is submerged.

Air chambers designated by reference numbers 48 and 50 are best seen in FIG. 3 and are formed by the air-tight coupling of the two concave-convex lenses to the tubular ring of each lens group. As a result of increasing water pressure with increasing depths, the two concave-convex lenses of each lens group are mechanically forced together, compressing tubular members 30 and 38 and increasing the air pressure within air chambers 48 and 50. This mechanical compression of the lens elements permits the air pressure and water pressure to equalize and substantially reduces the stress induced on the surfaces of the concave-convex lenses.

The concave-convex lenses are typically made from plastic, glass or a similar hard, transparent refractive material suitable for use in an optical system. The optical qualities of the underwater vision device are only minimally affected by the compression of the various lenses in each lens group.

The unique configuration of the underwater vision device of the present invention specifically positions second lens group 32 at a substantial distance in front of the corneal surface of the eye of the wearer. The pairing together of lens group 24 and 32 with an intervening flooding chamber 46, substantially increases the magnification power of this device in an underwater environment. Because of this magnification enhancement resulting from this unique structure, a substantially larger radius of curvature can be utilized with the various concave-convex lenses which form each of the lens elements. This significantly minimizes peripheral distortion and therefore dramatically increases the field of vision of the present invention in comparison to prior art devices which utilize less complex lens systems having lenses with a much smaller radius of curvature. In these prior art devices the field of view is extremely limited.

Although the lenses 26, 28, 34 and 36 are neutral in air, each lens has refracting power when one of its surfaces is in contact with water and the other surface is still in contact with the air in chambers 46 and 50. When underwater the focal length of each lens will equal its radius of curvature times four. Since there are four lenses in first and second lens groups 24 and 32, the overall focal length of the submerged device will equal the radius of curvature of each lens. This submerged focal length will equal about three inches but will be reduced to about two inches by the lens in the wearer's own eyeball. This two inch focal length is approximately the distance between the wearer's retina and the middle of the lens system of the device. The unique structure of the present invention permits the overall optical effect of each lens element to be neutral in air, but powerful and positive when immersed in water. If desired, the elements of each lens system could be adjusted to correct for ordinary refractive errors in vision in air. Certain refractive errors such as corneal astigmatism will be corrected by the wetting of the cornea while the user is underwater.

Referring now to FIGS. 4 and 5, an embodiment of the underwater vision device of the present invention is illustrated which includes tapered lens elements.

The dotted lines emanating from the corneal surface 60 of the wearer's eye are identified by reference number 62. Dotted lines 62 indicate that the maximum in focus field of view is limited by the position at which tube 38 is coupled to lens 34. It is therefore possible to taper or reduce the diameter of lenses 36, 26 and 28 in the manner indicated in FIGS. 4 and 5 without limiting or restricting in any way the wearer's in focus field of view. As is specifically illustrated, tubes 38 and 30 and spacer means 40 have reduced diameters over the previously described embodiment of the invention.

Since the inner or first lens group 24 has a substantially reduced diameter in comparison to lens group 24 as illustrated in FIGS. 1–3, it is possible to significantly reduce the size of front element 10 and the diameter of the circular apertures in front element 10 to which lens elements 28 are coupled. The wearer's peripheral vision is thus substantially increased due to the substantially decreased physical size of front element 10.

Referring now to FIG. 6, another embodiment of the underwater vision device of the present invention is illustrated which incorporates a collapsible bladder 64. Bladder 64 is fabricated from an expandable plastic or rubber-like material and is inflated as illustrated and coupled to ear piece 16. Although not specifically illustrated, a symmetrically identical collapsible bladder should be coupled to ear piece 14 and to lens element 20.

A length of tubing 66 is coupled at one end to the airfilled interior of bladder 64 and at the opposite end to an aperture in the exposed outer surface of tube 30 as illustrated. A T-connector 68 is coupled in series with tubing 66. A second length of tubing 70 connects the third port of T-connector 68 to the interior of tubing 38. Tubing elements 30 and 38 each include a second aperture indicated generally by reference numbers 72 and 74. The system of elements described above is coupled to collapsible bladder 64 to permit the air pressure within bladder 64 to be equal to the air pressure within tubes 30 and 38 and within air chambers 48 and 50.

As the individual wearing the version of the underwater vision device illustrated in FIG. 6 descends to increasing depths below the surface of the water, bladder 64 is increasingly collapsed which serves to increase the air pressure within air chambers 48 and 50 and within tubing 30 and 38. This increasing air pressure counterbalances the compressive forces exerted on lenses 34 and 36 and 26 and 28 and thereby significantly reduces the change in spacing between the lenses of the first and second lens groups and assists in maintaining the desired optical qualities of first and second lens elements 20 and 22. It will be readily apparent to one of ordinary skill in the art that the pressure equalization system described above may be implemented by using various different types of structure having a form significantly different from the structure illustrated in FIG. 6.

Referring now to FIG. 7, yet another embodiment of the underwater vision device of the present invention is described. In this embodiment lens elements 20 and 22 are not coupled directly to front element 10, but are coupled to spacing means in the form of a bracket assembly illustrated generally by reference number 76. Bracket assembly 76 includes two horizontally oriented brackets 78 and 80 which are coupled at one end to front piece 10. The actual length of bracket assembly 76 can be modified as necessary to permit the desired amount of fore and aft displacement of lens elements 20 and 22 with respect to the eye of the wearer.

Brackets 78 and 80 each include an enclosed groove 82 which extends along virtually the entire length of each bracket. A plurality of four pins, such as pin 84, extend laterally outward from lenses 26 and 36 and pass through grooves 82 as illustrated. Grooves 82 and pins 84 form a slip joint coupling between bracket assembly 76 and lens element 22. A mirror image of the structure illustrated in FIG. 7 provides a slip joint connection or coupling of a similar manner for first lens element 20. These two slip joint systems permit the underwater vision device of the present invention to be adjusted to focus at distances quite close to the device or, alternatively, can permit the wearer to correct for either nearsighted vision or far-sighted vision.

It will be apparent to those skilled in the art that the various versions of the underwater vision device disclosed above may be modified in numerous ways and may assume many embodiments other than the preferred forms specifically set out and described above. For example, the underwater vision device can be implemented by including combinations of two or more of the various different embodiments described above. In addition, numerous different, but structurally equivalent embodiments of the various versions of the invention can be readily fabricated by one of ordinary skill in the art. Accordingly, it is intended by the appended claims to cover all such modifications of the invention which fall within the true spirit and scope of the invention.

What is claimed:
1. An underwater vision device supported by the nose and ears of a wearer comprising:
   a. a frame including
      (i) a front element having a nose piece for contacting and being supported by the wearer's nose, said front element having first and second apertures aligned with the wearer's eyes;
      (ii) a first ear piece coupled to one end of said front element and a second ear piece coupled to one end of said front element, said first and second ear pieces contacting the wearer's ears to maintain said frame in a desired fixed position on the wearer's head;
   b. first and second lens elements coupled to said front element in alignment with the first and second apertures, each of said lens elements including
      (i) a first lens group having one end coupled to said front element in alignment with one of the apertures therein, said first lens group including
         A. a first solid transparent substantially circular lens having a first lens area;
         B. a second solid transparent substantially circular lens having a second lens area larger than said first lens area;
         C. securing means coupled to said first and second lenses for securing said first and second lenses together and for forming a sealed air chamber between said first and second lenses;
      (ii) a second lens group coupled to said first lens group and including
         A. a first solid transparent substantially circular lens having a third lens area larger than the second lens area
         B. a second solid transparent substantially circular lens having a fourth lens area larger than said third lens area
         C. securing means coupled to said first and second lenses for securing said first and second lenses together and for forming a sealed air chamber between said first and second lenses; and (iii) spacer means coupled to said first and second lens group for maintaining a predetermined spacing between said first and second lens groups, for maintaining said second lens group in alignment with said first lens group, and for forming a cavity between said first and second lens groups which fills with water when said device is immersed in water.

2. The underwater vision device of claim 1 wherein the diameter of the lenses in said first and second lens groups increase as a function of the spacing from said front element.

3. The underwater vision device of claim 1 wherein the first and second solid transparent lenses of said first and second lens groups are concave-convex lenses.

4. The underwater vision device of claim 3 wherein the first and second solid transparent lenses in said first and second lens groups are positioned convexity to convexity.

5. The underwater vision device of claim 1 wherein a cavity is formed between said first lens element and the cornea of the wearer's eye, said cavity being filled with water when the wearer's head is submerged below the surface of a body of water.

6. The underwater vision device of claim 1 wherein said securing means includes a circular gasket.

7. The underwater vision device of claim 1 wherein said securing means includes a length of hollow plastic tubing formed into a circle and joined end-to-end.

8. The underwater vision device of claim 7 wherein the interior of said hollow tubular member is filled with a gas which permits the outer walls of said tubular member to compress as said underwater vision device is submerged below the surface of the water, thereby permitting the air between said first and second lenses to be compressed as said first and second lenses are displaced toward one another by the pressure of the water.

9. An underwater vision device supported by the nose and ears of a wearer comprising:
   a. a frame including
      (i) a front element having a nose piece for contacting and being supported by the wearer's nose, said front element having first and second apertures aligned with the wearer's eyes
      (ii) a first ear piece coupled to one end of said front element and a second ear piece coupled to the other end of said front element, said first and second ear pieces contacting the wearer's ears to maintain said frame in a desired fixed position on the wearer's head;
   b. first and second lens elements coupled to said front element in alignment with the first and second apertures, each of said lens elements including
      (i) a first lens group having one end coupled to said front element in alignment with one of the apertures therein, said first lens group including
         A. a first solid transparent lens
         B. a second solid transparent lens
         C. securing means coupled to said first and second lenses for securing said first and second lenses together and for forming a first sealed air chamber between said first and second lenses;
      (ii) a second lens group coupled to said first lens group and including
         A. a first solid transparent lens
         B. a second solid transparent lens
         C. securing means coupled to said first and second lenses for securing said first and second lenses together and for forming a second sealed air chamber between said first and second lenses;
      (iii) an air filled collapsible bladder coupled to said first and second sealed air chambers for increasing the air pressure within said sealed air chambers as the ambient water pressure increases; and
      (iv) spacer means coupled to said first and second lens groups for maintaining a predetermined spacing between said first and second lens groups, for maintaining said second lens group in alignment with said first lens group, and for forming a cavity between said first and second lens groups which fills with water when said device is immersed in water.

10. The underwater vision device of claim 9 wherein said collapsible bladder is coupled to one of said ear pieces.

11. The underwater vision device of claim 9 wherein said securing means includes a length of hollow plastic tubing formed into a circle and joined end-to-end.

12. The underwater vision device of claim 11 further including a length of tubing coupled at one end to said collapsible bladder and coupled at the opposite end to an aperture in the wall of said hollow plastic tubing which forms said first sealed air chamber.

13. The underwater vision device of claim 12 wherein said lengths of hollow plastic tubing which form said first and second sealed air chambers each include an aperture communicating with said first and second sealed air chambers for permitting air to flow between said collapsible bladder and said first and second sealed air chambers.

14. An underwater vision device coupled to the head of an individual comprising:
   a. a frame coupled to the individual's head;
   b. first and second lens elements each including:
      (i) a first lens group including
         A. a first solid transparent lens
         B. a second solid transparent lens
         C. securing means coupled to said first and second lenses for securing said first and second lenses together and for forming a sealed air chamber between said first and second lenses;
      (ii) a second lens group coupled to said first lens group and including
         A. a first solid transparent lens
         B. a second solid transparent lens
         C. securing means coupled to said first and second lenses for securing said first and second lenses together and for forming a sealed air chamber between said first and second lenses;
      (iii) spacer means coupled to said first and second lens groups for maintaining a predetermined spacing between said first and second lens groups, for maintaining said second lengs group in alignment with said first lens group, and for forming a cavity between said first and second lens groups which fills with water when said device is immersed in water; and
   c. means coupled to said frame and to said first and second lens elements for maintaining said first and second lens elements in alignment with the individual's eyes and for permitting the spacing between said lens elements and the individual's eyes to be adjusted.

15. The underwater vision device of claim 14 wherein said frame further includes a front element having a nose piece for contacting and being supported by the individual's nose.

16. The underwater vision device of claim 15 wherein said spacing means further includes:
   a. a first bracket assembly coupled to said frame and to said first lens element; and
   b. a second bracket assembly coupled to said frame and to said second lens element.

17. The underwater vision device of claim 16 wherein said front element includes first and second apertures aligned with the individual's eyes.

18. The underwater vision device of claim 17 wherein the front element of said frame is aligned with a plane parallel to the face of the individual and wherein said first and second bracket assemblies extend perpendicularly outward from said front element.

19. The underwater vision device of claim 18 wherein said first and second bracket assemblies each include a slip joint for slidably coupling said first and second lens elements to said bracket assemblies.

20. An underwater vision device supported by the nose and ears of a wearer comprising:
   a. a frame coupled to the head of the wearer and including
      (i) a front element having a nose piece for contacting and being supported by the wearer's nose, said front element having first and second apertures aligned with the wearer's eyes
      (ii) a first ear piece coupled to one end of said front element and a second ear piece coupled to the other end of said front element, said first and second ear pieces contacting the wearer's ears to maintain said frame in a desired fixed position on the wearer's head;
   b. first and second lens elements coupled to said front element in alignment with the first and second apertures, each of said lens elements including
      (i) a first lens group having one end coupled to said front element in alignment with one of the apertures therein, said first lens group including
         A. a first solid transparent lens
         B. a second solid transparent lens
         C. securing means coupled to said first and second lenses for securing said first and second lenses together and for forming a sealed air chamber between said first and second lenses;
      (ii) a second lens group coupled to said first lens group and including
         A. a first solid transparent lens
         B. a second solid transparent lens
         C. securing means coupled to said first and second lenses for securing said first and second lenses together and for forming a sealed air chamber between said first and second lenses;
      (iii) spacer means coupled to said first and second lens groups for maintaining a predetermined spacing between said first and second lens groups, for maintaining said second lens group in alignment with said first lens group, and for forming a cavity between said first and second lens groups which fills with water when said device is immersed in water; and
   c. means coupled to said frame and to said first and second lens elements for maintaining said first and second lens elements in alignment with the individual's eyes and for permitting the spacing between said lens elements and the individual's eyes to be adjusted.

* * * * *